| United States Patent [19] | [11] Patent Number: 4,916,094 |
| Salinas | [45] Date of Patent: Apr. 10, 1990 |

[54] METHOD FOR PRODUCING HIGH SOLIDS KAOLIN SLURRY

[75] Inventor: Jorge Salinas, Homestead, Fla.

[73] Assignee: E.C.C. America Inc., Altanta, Ga.

[21] Appl. No.: 222,279

[22] Filed: Jul. 21, 1988

[51] Int. Cl.⁴ .............................................. C04B 33/04
[52] U.S. Cl. .................................... 501/146; 501/147; 501/148; 501/149
[58] Field of Search ............... 501/145, 146, 147, 148, 501/149

[56] References Cited

U.S. PATENT DOCUMENTS

| 4,381,948 | 5/1983 | McConnell et al. | 501/145 |
| 4,604,369 | 8/1986 | Shi | 501/148 |
| 4,650,521 | 3/1987 | Koppelman et al. | 501/147 |
| 4,772,332 | 9/1988 | Nemeh et al. | 501/146 |

*Primary Examiner*—William R. Dixon, Jr.
*Assistant Examiner*—Anthony J. Green
*Attorney, Agent, or Firm*—Klauber & Jackson

[57] ABSTRACT

A bleached, dispersed, high solids slurry is produced from unprocessed crudes at low pH and with minimum work input, using polyacrylic acid as the dispersant. The process involves making the slurry at the highest solids possible without resorting to filtration or spray drying.

5 Claims, 1 Drawing Sheet

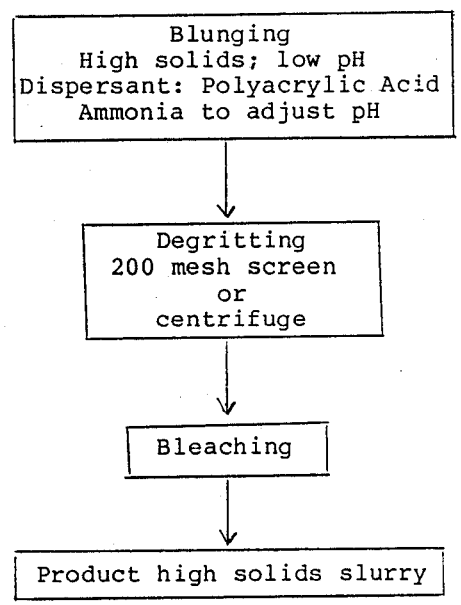

METHOD FOR PRODUCING HIGH SOLIDS KAOLIN SLURRY

FIELD OF THE INVENTION

The present invention relates to the processing of clay minerals and, more particularly, is directed to the processing of kaolinitic clays at high solids under acidic conditions to produce an improved paper filler composition.

Further, this invention relates to a simplified method for producing a high solids kaolin slurry at a acid pH, that is usable by the paper industry as a paper filler without filtration or spray drying yet with attainment of rheological properties similar to those obtained using spray dried product.

BACKGROUND OF THE INVENTION

In the course of manufacturing paper and similar products, including paperboard and the like, it is well-known to incorporate quantities of inorganic materials into the fibrous web in order to improve the quality of the resulting product. In the absence of such fillers, the resultant paper can have a relatively poor texture due to discontinuities in the fibrous web. The said fillers are also important in improving the printing qualities of the paper, i.e., by improving the surface characteristics of same. The use of appropriate such fillers further vastly improves the opacity and the brightness of a paper sheet of a given weight. The brightness and opacifying sheet, one which incorporates whiteness, high opacity, good printability and light weight.

According to Koppelman et al. in U.S. Pat. No. 4,650,521, it has become customary in the industry to beneficiate the crude kaolinitic clays used in clay filler compositions for paper making to improve particle size distribution and also improve color characteristics by removing ferric iron-containing compounds in the clay. Such ferric iron-containing compounds impart a non-white color to the clay and reduce the overall brightness or reflectance to visible light of the clay. It is well-known that the effect of these ferric iron-containing compounds may be reduced by treating the clay with a reducing agent which converts the ferric ion to the less highly colored ferrous ion. A variety of reducing agents are known to be suitable for treating kaolinitic clays, but the most commonly used reducing agents are water-soluble dithionites or sulphites, such as sodium dithionite, zinc dithionite, sodium bisulphite, sodium hydrosulphite, and sodium pyrosulphite. Further, according to the patentees, in the conventional process for reducing the ferric iron-containing impurities in a kaolinitic clay to the ferrous state, a low solids aqueous suspension of the crude clay is first formed, then if desired, degritted to remove large particles, and then treated with a reducing agent to convert the ferric ions therein to the ferrous state. The ferrous ion is generally very soluble in water and will pass into the water in which the clay is suspended. The treated clay is then thickened, dewatered by filtration and the resultant filter cake thermally dried to produce a clay filler product having a high solids content suitable for economic transport. Such a low solid content process requires that the clay suspension be in a fluid state, that is, that the solids content of the crude clay suspension be less than about 50% by weight and usually in the range of 20% to 35% by weight. Unfortunately such low solids processing of the crude kaolin requires that significant dewatering and drying be carried out to ready the treated clay product for economic transport. Significant economic benefits would be obtained if the crude kaolin clay could be processed at a high solids content so that the dewatering and subsequent drying of the treated clay could be minimized or eliminated.

These are also some of the objectives of the present invention but simplified measures and lower work input are used for their attainment.

Thus, an object of the invention is to produce a bleached, dispersed, high solids slurry from unprocessed crudes at low pH, and with minimum work input, and to make the slurry at the highest solids possible without filtration or spray drying.

A further object is the production of fine coating clay slurries for paper using fine clays such as the South Carolina clays.

SUMMARY OF THE INVENTION

The invention is directed to a process for treating a crude kaolin clay mineral which comprises: (a) blunging the clay in sufficient water to form an aqueous suspension having a solids content of at least 60% by weight, adding sufficient ammonia to adjust the pH to within the range of about 3.0 to below 6.0 and adding polyacrylic acid as a dispersant; (b) degritting to remove particles larger than those that would pass through a 200 mesh screen; (c) bleaching the suspension with a reducing bleaching agent; and (d) recovering a clay suspension of increased brightness and improved color having a solids content of at least 60% by weight.

The crude kaolin is processed at a solids content of at least 60% by weight, preferably at least 70% by weight and at an acid pH in the range of about 3.0 to below 6.0, preferably about 3.0 to about 4.5. Degritting may be accomplished by screening, preferably by centrifugation.

It may be noted that in contrast to the method of U.S. Pat. No. 4,650,521 in which a combination dispersing agent made up of sodium carbonate, sodium polyacrylate and sodium metaphosphate is used, the present process uses only a single dispersing agent, polyacrylic acid (PAA). Also, whereas the patentees in Example 1A blunge a 72% solids suspension for 18 hours, by contrast in the present method, owing to better dispersion and homogeneity, it is only necessary to blunge for short times measurable in minutes rather than hours. The resulting suspensions are stable and fully bleach responsive.

It has now been found that acidity is important in order for the clay to respond to reductive bleaching. Clay slurries respond to reductive bleaching with thiosulphates at low pH; this response increases with decreasing pH.

Another factor to be considered in the processing of crudes at high solids, is the presence, and concentration, of residue in the final slurry since large particles could be abrasive to the paper-making machinery. The high solids slurry has to be fluid to allow either screening through a fine mesh screen, or centrifugation, to reduce its residue content; consequently, its low shear viscosity should be relatively low.

Experiments with crudes of different particle size distributions indicate that it is possible to produce low pH, high solids slurries using polyacrylic acid as the dispersant. Slurries with solids concentrations at or above 70% can be achieved at pH below 6.0. These slurries are stable and homogeneous, and have rheological properties similar to those produced using spray dried product.

BRIEF DESCRIPTION OF THE DRAWING

The drawing is a flow diagram illustrating the process of the invention.

DETAILED DESCRIPTION

In the following experiments, the method of the invention was applied to a variety of kaolin crudes obtained from different mines in South Carolina.

The general procedure used for preparing the high solids clay slurries was as follows:

a. A premeasured amount of clay was added to enough water in a blunging cell to make the slurry at the required solids concentration. The clay was blunged with the water for two to three minutes, after which 1.5 ml of ammonia was added in 0.5 ml. aliquots to adjust the initial pH of the slurry.

b. Polyacrylic acid was added to the clay slurry in 1.00 lb./ton clay aliquots, and the low shear rheology of the slurry was measured after each addition to determine the slurry's dispersant demand. The point of maximum dispersion was reached when the low shear rheology of the clay slurry reached a minimum.

c. The clay slurry was subjected to screening through a 325 mesh screen, or to centrifugation, to reduce its residue content. Centrifugation was the preferred method due to the very thick nature of the high solids slurry, and the very high screening times required to screen the product through the fine mesh screen.

d. The slurry was finally bleached by the addition of 8 lbs./ton clay of Hydroline (sodium thiosulfate).

The flow diagrams shows one embodiment according to the invention of the processing steps used in the production of the high solids slurry.

The crudes used in these experiments were Harrison, Elkins, Continental Can, and Walden A. These crudes were chosen for the study because of their varied particle size distributions.

TABLE 1

Physical properties of the crudes used for the evaluation of polyacrylic acid (Rohm & Hass product U-1010)

| Crude | HARRISON | ELKINS | CONT. CAN | WALDEN A |
|---|---|---|---|---|
| Brightness | 81.6 | 84.0 | 86.6 | 80.9 |
| Residue | 1.4 | 4.3 | 0.9 | 5.8 |
| % ≦ 2 μm | 59.0 | 76.0 | 86.0 | 92.0 |
| Surface Area | 15.1 | 15.4 | 21.2 | 23.5 |

The makedown properties of each one of the crudes tested are described below.

HARRISON

The maximum solids reached for the slurry of Harrison crude dispersed at pH 3.6 was 60.8 wt %. This crude had a dispersant demand of 8.9 lbs./ton dry clay at this pH and solids concentration. Table 2 shows the results.

TABLE 2

Properties of slurry made with Harrison crude

| ml. PAA | Dosage lbs./ton clay | Brookfield (cp @ 20 rpm) | Hercules (dy/4400) |
|---|---|---|---|
| 7.6 | 6.70 | 580 | 6.5 |
| 8.9 | 7.84 | 270 | 7.0 |

TABLE 2-continued

Properties of slurry made with Harrison crude

| ml. PAA | Dosage lbs./ton clay | Brookfield (cp @ 20 rpm) | Hercules (dy/4400) |
|---|---|---|---|
| 10.1 | 8.90 | 210 | 7.0 |
| 11.4 | 10.04 | 220 | 7.0 |
| 12.7 | 11.19 | 240 | 7.0 |

| Ammonia used | 4.0 ml |
|---|---|
| pH of final slurry | 3.6 |
| Percent solids | 60.8% |
| Brightness | |
| Crude | 81.6 |
| Bleached (day one) | 82.6 |
| Bleached (day ten) | 83.2 |
| Residue of product (325 mesh) | 0.597 |

The pH of the slurry was increased from 3.6 to 4.0 in order to make a slurry at higher solids using the same crude. This increase produced a very stable slurry at 71.4% solids with very stable, good low shear viscosity and bleach brightness response. The dispersant demand of this slurry was 13.2 lbs./ton clay. Table 3 summarizes the physical properties of this slurry.

TABLE 3

Properties of slurry made with Harrison crude (centrifuged)

| ml. PAA | Dosage lbs./ton dry clay | Brookfield (cp @ 20 rpm) | Hercules (dy/rpm) |
|---|---|---|---|
| 6 | 9.93 | 300 | 18/460 |
| 7 | 11.59 | 150 | |
| 8 | 13.24 | 120 | |
| 9 | 14.90 | 120 | |
| 10 | 16.55 | 120 | |
| 11 | 18.21 | 120 | 18/400 |

| Ammonia used | 6.5 ml |
|---|---|
| pH of final slurry | 4.0 |
| Percent solids (after centrifuging) | 71.4% |
| Brightness | |
| Crude | 81.6 |
| Bleached (day one) | 82.3 |
| Bleached (day ten) | 83.7 |
| Residue of product (325 mesh) | 0.0017 |

CONTINENTAL CAN

Continental Can was dispersed at 60.4% solids and a pH of 3.8. The dispersant demand of the slurry was 14.6 lbs. PAA/ton dry clay under these conditions and the dispersant demand for a 71.1% solids slurry at pH 5.1 was 9.1 lbs. FAA/ton dry clay. Tables 4 and 5 summarize the physical properties of these slurries.

TABLE 4

Properties of slurry made with Continental Can crude (screened)

| ml. PAA | Dosage lbs./ton dry clay | Brookfield (cp @ 20 rpm) | Hercules (18 dynes/rpm) |
|---|---|---|---|
| 2.0 | 11.16 | 1230 | 1800 |
| 2.2 | 12.28 | 820 | |
| 2.4 | 13.40 | 560 | |
| 2.6 | 14.51 | 500 | |
| 2.8 | 15.63 | 580 | |
| 3.0 | 16.74 | 730 | 920 |

| Ammonia used | 1.9 ml |
|---|---|
| pH of final slurry | 3.8 |
| Percent solids (after screening) | 60.4% |
| Brightness | |
| Crude | 86.6 |
| Bleached (day one) | 87.0 |
| Bleached (day ten) | 88.0 |

TABLE 4-continued

Properties of slurry made with Continental Can crude (screened)

| ml. PAA | Dosage lbs./ton dry clay | Brookfield (cp @ 20 rpm) | Hercules (18 dynes/rpm) |
|---|---|---|---|
| Residue of product (325 mesh) | | | 0.293 |

TABLE 5

Properties of slurry made with Continental Can (centrifuged)

| ml. PAA | Dosage lbs./ton dry clay | Brookfield (cp @ 20 rpm) |
|---|---|---|
| 1.1 | 5.22 | 1840 |
| 1.4 | 6.52 | 670 |
| 1.7 | 7.83 | 570 |
| 2.0 | 9.13 | 550 |
| 2.2 | 10.43 | 580 |

| | |
|---|---|
| Ammonia used | 2.0 ml |
| pH of final slurry | 5.1 |
| Percent solids (after centrifuging) | 71.8% |
| Brightness | |
| Crude | 86.2 |
| Bleached (day one) | 86.6 |

The tables above show that Continental Can crude can be dispersed at high solids (71.8%) and low pH. The low shear viscosity of the slurries with concentrations of this crude above 60 wt. % cannot be adjusted to less than 500 cps. The dispersant demand of the crude decreases with increasing concentration, but the pH of the slurry has to be adjusted upwards in order to reach higher concentrations of the crude in the slurry.

WALDEN-A

Table 6 shows the physical properties of a slurry made with Walden A crude at 64.1% solids, and Table 7 shows the physical properties of a 68.0% solids slurry of Walden A at a pH of 5.5.

Walden A presented problems during the dispersion in the blunging cell; the slurry makedown required a high amount of polyacrylic acid for dispersion, and high work input. The slurry behaved during makedown as if the dispersant had degraded due to the high heat produced as a consequence of the high work input required by the crude to make down. A second slurry was made at similar pH but with less work input. Tables 6 and 7 show the physical properties of the slurries made down at the different work inputs. The amount of work required to make to second slurry was lowered by using a Waring blender instead of the blunging cell.

TABLE 6

Properties of the slurry made with Walden-A crude (centrifuged)

| ml. PAA | Dosage lbs./ton clay | Brookfield (cp @ 20 rpm) | Hercules (dy/rpm) |
|---|---|---|---|
| 6 | 8.73 | | 18/620 |
| 7 | 10.18 | | |
| 8 | 11.64 | | |
| 9 | 13.09 | 380 | |
| 10 | 14.55 | 490 | |
| 11 | 16.00 | 590 | 18/560 |

| | |
|---|---|
| Ammonia used | 12.0 ml |
| pH of final slurry | 5.4 |
| Percent solids (after centrifuging) | 64.1% |
| Brightness | |
| Crude | 80.9 |
| Bleached (day one) | 83.4 |
| Bleached (day ten) | 84.0 |

TABLE 6-continued

Properties of the slurry made with Walden-A crude (centrifuged)

| ml. PAA | Dosage lbs./ton clay | Brookfield (cp @ 20 rpm) | Hercules (dy/rpm) |
|---|---|---|---|
| Residue of product (325 mesh) | | | 0.015% |

Table 7 shows the results of a second attempt to disperse Walden A crude at high solids. The slurry was made down at 68% solids and pH 5.5. The slurry required a lesser amount of PAA for dispersion, but it produced a slurry of very high low shear rheology.

TABLE 7

Properties of slurry made with Walden-A crude (centrifuged)

| ml. PAA | Dosage lbs./ton dry clay | Brookfield (cp @ 20 rpm) |
|---|---|---|
| 0.4 | 2.24 | 1340 |
| 0.7 | 3.36 | 1190 |
| 0.9 | 4.48 | 1170 |

| | |
|---|---|
| Ammonia used | 1.0 ml |
| pH of final slurry | 5.5 |
| Percent solids (after centrifuging) | 68.0% |
| Brightness | |
| Crude | 80.9 |
| Bleached (day one) | 83.3 |

Both Tables 6 and 7 indicate that it is possible to produce slurries with Walden A crude; however, they require more work for the makedown and a relatively high pH.

ELKINS

Elkins was another crude that gave problems during makedown at low pH with U-1010. The crude required high input of work and did not mix well during blunging. Table 8 summarizes the physical properties of the slurry.

TABLE 8

Properties of slurry made with Elkins crude

| ml. PAA | Dosage lbs./ton clay | Brookfield (cp @ 20 rpm) | Hercules (dy/4400) |
|---|---|---|---|
| 12.9 | 11.10 | 1850 | 5 |
| 14.2 | 12.22 | 1580 | |
| 15.5 | 13.34 | 1360 | |
| 16.8 | 14.46 | 1330 | |
| 18.1 | 15.58 | 1350 | |
| 19.4 | 16.70 | 1330 | |
| 20.6 | 17.73 | 1380 | |
| 21.9 | 18.85 | 1460 | 6 |

| | |
|---|---|
| Ammonia used | 8.5 ml |
| pH of final slurry | 3.2 |
| Percent solids (after centrifuging) | 60.4% |
| Brightness | |
| Crude | 84.0 |
| Bleached (day one) | 85.2 |
| Bleached (day ten) | 85.0 |
| Residue of product (325 mesh) | 0.223 |

Elkins is a crude that produces very good slurries when dispersed at higher pH.

Conclusions

The results gathered in these experiments indicate that it is possible to process crudes in the acid range of the pH scale using polyacrylic acid as the dispersant. Slurries of high solids (above 70%) can be made at pH values between 4.5 and 6.0 depending on the crude used. The pigment in the slurries can be bleached using conventional Hydroline at regular dosages (8 lbs./ton clay); however, the bleach response of the clay increases with decreasing pH and increasing contact time.

The processing properties of the crudes appear to be dependent on the concentration of residue in the crude. The best working parameters were found in the crudes with the lesser amount of residue, such as Continental Can and Harrison crudes.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. A process for treating a crude kaolin clay mineral which comprises:
   a. blunging the clay in sufficient water to form an aqueous suspension having a solids content of at least 60% by weight for a period of time in the range of about two minutes to less than an hour, adding sufficient ammonia to adjust the pH to within the range of about 3.0 to about 4.5 and adding polyacrylic acid as a dispersant, employing a quantity of dispersant sufficient to achieve substantially minimum low shear viscosity;
   b. degritting to remove particles larger than those that would pass through a 200 mesh screen;
   c. bleaching the suspension with a reducing bleaching agent; and
   d. recovering a clay suspension of increased brightness and improved color having a solids content of at least 60% by weight.

2. The process according to claim 1 in which degritting is accomplished by screening.

3. The process according to claim 1 in which degritting is accomplished by centrifugation.

4. The process according to claim 1 in which the bleaching agent is sodium thiosulfate.

5. The process according to claim 1 in which the solids content is at least 70% by weight.

* * * * *